April 12, 1955

H. J. KNAPP 2,706,148

CONTINUOUS PRESSURE COOKING SYSTEM

Filed Jan. 2, 1951

INVENTOR.
H. J. Knapp
BY

April 12, 1955     H. J. KNAPP     2,706,148
CONTINUOUS PRESSURE COOKING SYSTEM
Filed Jan. 2, 1951     4 Sheets-Sheet 3

INVENTOR.
H. J. Knapp

April 12, 1955  H. J. KNAPP  2,706,148
CONTINUOUS PRESSURE COOKING SYSTEM
Filed Jan. 2, 1951  4 Sheets-Sheet 4

INVENTOR.
H. J. Knapp

United States Patent Office 2,706,148
Patented Apr. 12, 1955

2,706,148

CONTINUOUS PRESSURE COOKING SYSTEM

Hans John Knapp, Beaverton, Oreg., assignor to Grenco, Inc., Seattle, Wash., a corporation of Washington Application January 2, 1951, Serial No. 203,887

9 Claims. (Cl. 23—290.5)

The present invention relates to a continuous pressure cooking system, and more particularly to a system including a pressure cooker and novel feed and discharge units functioning with little loss of steam from the cooker to continuously feed and discharge material to and from the cooker.

In the wood pulp processing art, after the logs to be pulped have been reduced to chips, the resulting chips, usually still in a green condition, are often subjected to a steam cooking operation to remove certain acids and tars in the wood and to soften the chips preparatory to further processing. This practice has been normally conducted in the prior art by filling a high pressure cooker with the chips, charging the cooker with steam, venting the cooker after the desired cooking time has expired, and then emptying the chips from the cooker. Perforce this method is open to the objection that considerable time is required to fill and empty the cooker as well as the objection that the cooker must be vented each time the cooker is emptied. These objections are equally as relevant in the present methods of processing many comestibles in large quantities such as, for example, the steam treating of hashed or ground meat and bone to liberate certain fats and oils. Accordingly, although the present invention was particularly designed to handle wood chips, it is important to note that it can also be used to handle a variety of other materials and hence, although the later detailed explanation of the invention makes particular reference to wood chips for purposes of example, no limitation in the use of the invention is intended thereby.

Accordingly, it is a principal object of the present invention to provide a continuous pressure cooking system whereby material can be continuously conveyed to and from a pressure cooking operation.

A further object of the invention is to provide feed and discharge units adapted to continuously feed and discharge material to and from a pressure cooker without causing an objectionable loss of pressure in the latter.

Another object is to provide such feed and discharge units which will handle wood chips without causing a wedging and shearing of the chips between relatively moving parts of the units.

With the foregoing and other still more particular objects and advantages in view, the invention consists in the novel construction and in the adaptation and combination of parts hereinafter described and claimed.

Figure 4:
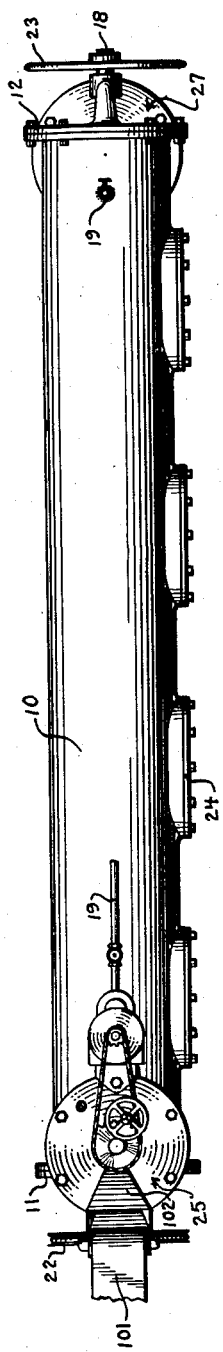
Fig. 4 is a top plan view of the continuous cooking system.
Figure 5:
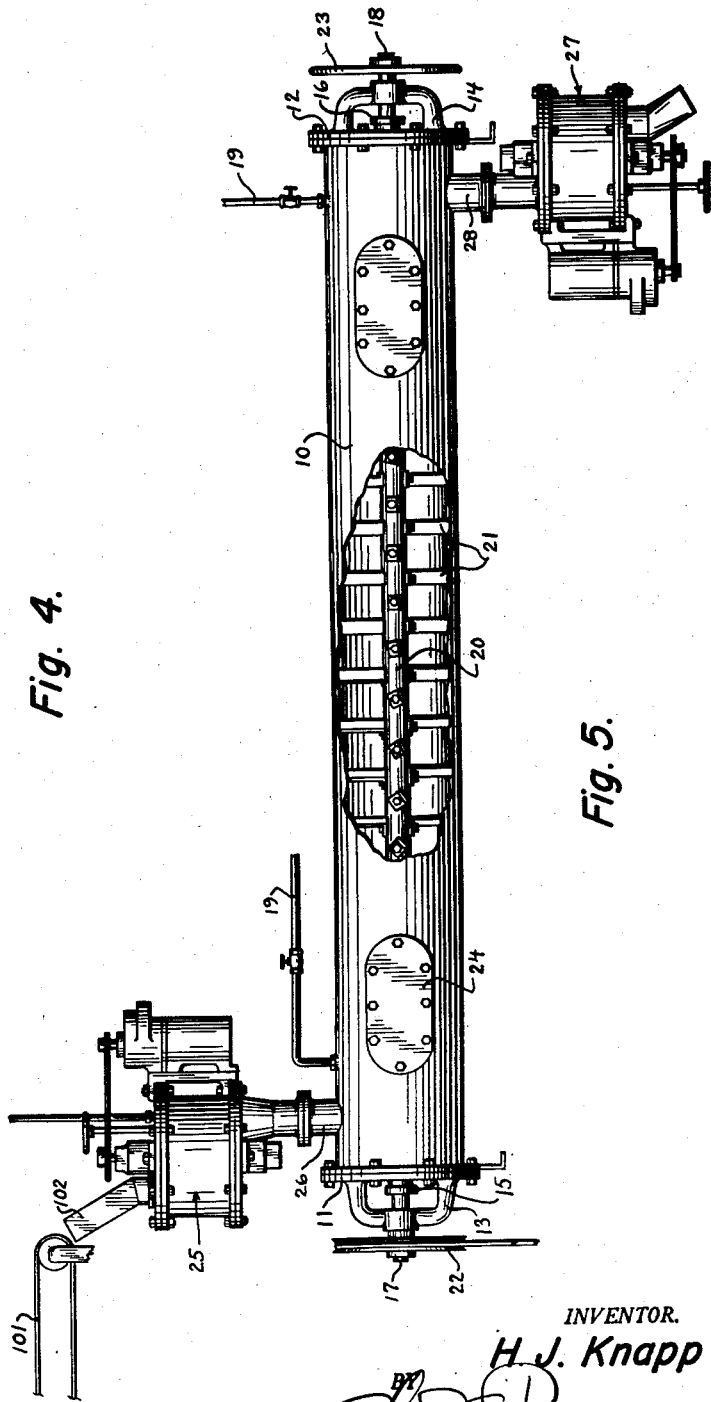
Fig. 5 is a side elevational view of the system.
Figure 7:
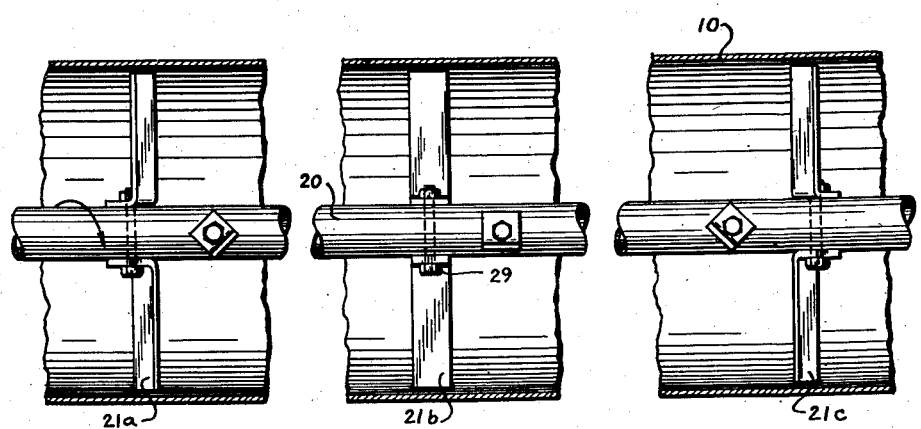
Fig. 7 is a fragmentary vertical sectional view of the cooker illustrating various positions of the vanes.

Referring to the drawings, and more particularly to Figs. 4 and 5 thereof, it is seen that the cooking system of the present invention utilizes an elongated cylindrical cooking drum 10 closed at the ends by plates 11 and 12 bolted to annular terminal flanges provided by the drum 10. These end plates carry U-shaped bearing brackets 13 and 14 and are centrally bored with the bores being provided with stuffing boxes whose retaining nuts are denoted by the numerals 15 and 16. Journaled in these bearing brackets and stuffing boxes are the stub shafts 17 and 18 of a shaft 20 extending the length of the cooker and provided with a plurality of L-shaped vanes 21. The free end of the stub shaft 17 carries a driving sprocket 22 and that of the other stub shaft may be provided with a wheel 23 for manually turning the shaft to gain access to the vanes 21 through hand holes provided in the drum and normally closed by removable cover plates 24. These hand holes are also useful when it is desired to clean the inside surface of the drum. Pipes 19 are provided to supply steam and any desired cooking liquors to the cooker. It will be noted that the material to be cooked is continuously supplied by a feed unit 25 communicating with the cooker via an inlet pipe 26 located at one end of the cooker and the cooked material is continually discharged from the opposite end of the cooker by a discharge unit 27 communicating with the cooker through an outlet pipe 28. The conveying of the material from the inlet to the outlet of the cooker is accomplished by the longer legs of the L-shaped vanes 21 and in this regard attention is directed to Fig. 7 wherein various adjusted positions of the vanes are illustrated. The vanes extend radially from the shaft and are arranged in pairs with the vanes of each pair being diametrically opposite and secured to the shaft by a common bolt 29 extending through the shaft and the short legs of the vanes. These pairs are staggered at ninety degrees and at spaced intervals of the length of the cooker. The angle that the plane of the long legs of the vanes forms with the axis of the shaft is varied to produce different effects as shown by the groups of vanes 21a, 21b, and 21c. It will be noted that the vanes 21a, near the cooker inlet, simulate a screw advancing in the direction of the arrow and hence cause the material to be pushed forwardly from the inlet. Certain other of the vanes, denoted by 21b, located near the middle of the cooker, may be adjusted with the plane of their longer legs parallel to the shaft axis so that they will perform solely a mixing function. The vanes 21c at the extreme outlet are often adjusted as shown to simulate a reversed screw so as to slow the progress of the material adjacent the outlet. Perforce the style and adjustment of the vanes will vary somewhat according to the particular material being handled, the amount of mixing preferred, and the length of cooking time desired.

Continuing to the feed unit, this unit utilizes a rotary valve 30 housed in the lower half of a cylindrical drum 31 with the longitudinal axis of the drum and the axis of rotation of the valve coinciding and assuming a vertical position. This drum presents outwardly extending annular end flanges 32 and 33 to which are secured top and bottom end plates 34 and 35, respectively, as by circumferentially spaced bolts 36. The rotary valve is seated against the bottom end plate 35 and has the general appearance in a plan view of a spoked wheel in that it comprises a centrally bored hub 37 and a concentric outer rim 38 joined together by a plurality of radially extending spokes or vanes 40. The outer diameter of the valve rim is somewhat smaller than the inside diameter of the drum to provide clearance between the valve and the drum. It will be noted that the valve is given a substantial thickness so as to provide fairly deep pockets 42 of a generally sectorial cross-section and open at the top and bottom with each being defined by a pair of adjacent vanes and the interconnecting portions of the hub and rim of the valve. The valve is covered by a circular pressure plate 44 having a central aperture 45 overlying and matching the bore in the valve hub, such bore being designated by the numeral 46. In order to prevent rotation of the pressure plate, the periphery of the plate is slotted at spaced intervals to provide grooves 47, shown as three in number, and these grooves slidably receive lugs 48 projecting inwardly from the drum. These lugs are somewhat greater in length than the thickness of the pressure plate and are positioned medially of the ends of the drum. The valve is driven through a shaft 50 having an enlarged central portion 51 extending between the top and bottom end plates and having top and bottom reduced end portions 52 and 53 protruding through the respective end plates. As can best be seen in Fig. 1, these end portions are journaled in aligned bushings 54 and 55 spaced above and below the corresponding end plates and carried, respectively, by bearing yokes 56 and 57 which are secured to the end plates. The upper end of the shaft extends beyond the yoke 56 and receives the hub of the drive sprocket 58 and the lower end of the shaft rests on a step bearing 59 carried by the lower bearing yoke. The central portion 51 of the shaft presents gear teeth 70 having a fairly free fit with meshing internal gear teeth 71 presented by the valve hub. This free fit makes a flexible connection between the valve and the shaft. The valve gear teeth 71 are made somewhat longer than the shaft teeth 70 to provide for any slight axial movement of the valve.

Figure 1:
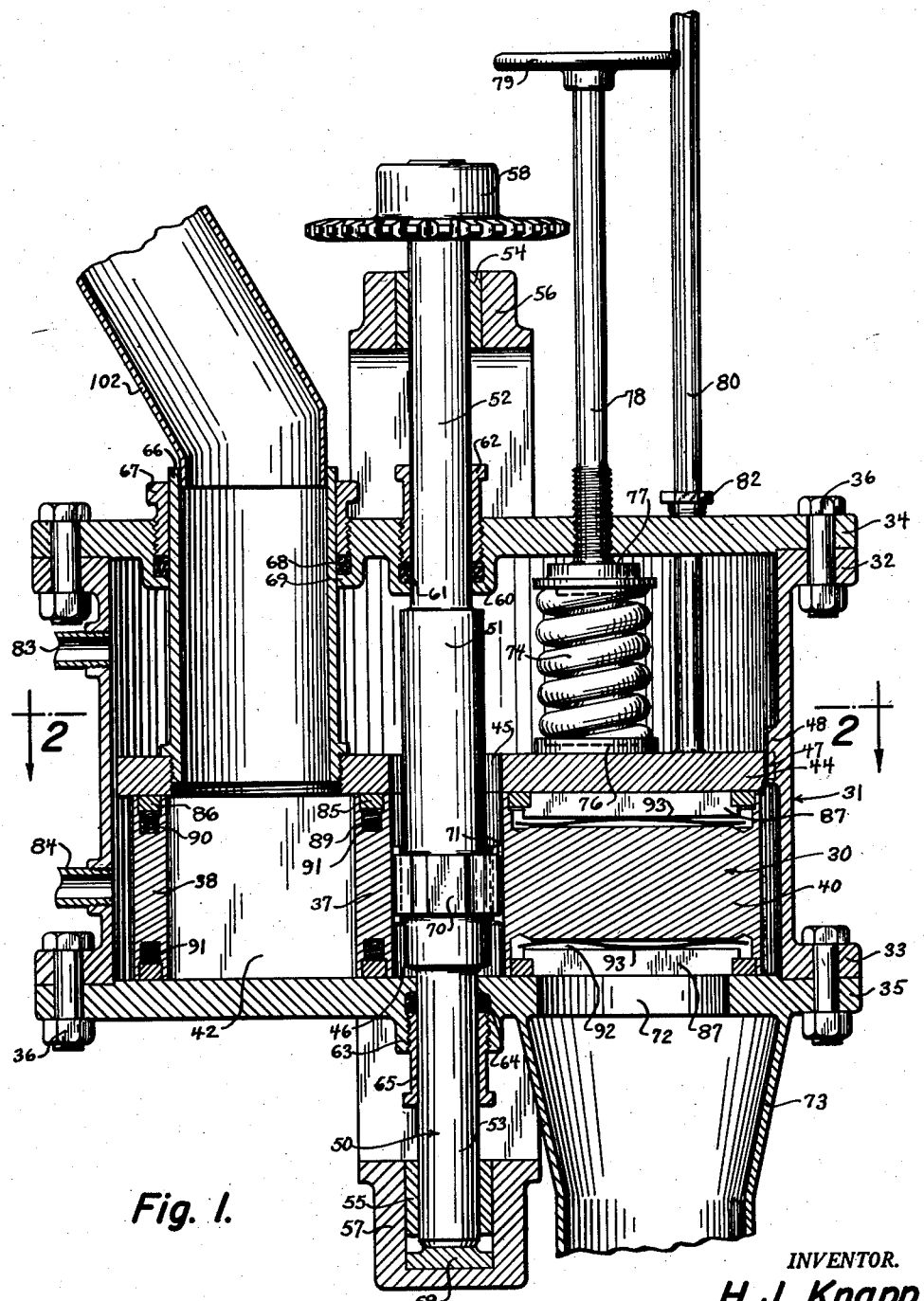
Figure 1 is a vertical sectional view of the feed unit taken along line 1—1 of Fig. 2.

As shown in Fig. 1, the upper end plate presents a central packing well 60 depending therefrom and in spaced surrounding relationship to the reduced upper end portion of the shaft. Packing 61 is held against the floor of this well by means of the packing nut 62 journaled in the shaft and threadably received in the end plate. A packing gland for the lower end plate presents a depending boss 63 whose internal bore is tapped and somewhat larger in diameter than the reduced lower end portion of the shaft extending therethrough. This internal bore is continued into the plate proper as a counterbore to provide a well for packing 64, which packing is held in position by a packing nut 65 screwed into the boss 63 and journaled on the shaft. It will be noted that access to the packing nuts 62 and 65 may be had through the open sides of the bearing yokes 56 and 57.

The valve pockets are successively filled from above by a slidable fill pipe 66 extending down into the drum through the upper end plate and threadably secured to the pressure plate with appropriate fill openings being provided in these plates. The opening in the end plate is enlarged and tapped to receive a packing nut 67 holding packing 68 in a depending packing well 69 similar to the afore-described packing well 60 for the shaft. Successive emptying of the pockets is accomplished through a discharge opening 72 in the bottom end plate. This opening may be circular as shown or sectoral, and is located at least one pocket distance away from the inlet pipe, and preferably diametrically opposite thereto. A discharge pipe 73 somewhat larger than the discharge opening depends from the lower end plate below the opening and this is coupled to the cooker inlet pipe 26.

The pressure plate is urged against the valve by a compression spring 74 preferably placed over the discharge opening so as to act in direct opposition to the force exerted on the underside of the pressure plate by steam from the cooker entering the lower part of the drum through the discharge opening. This spring is held in position by upper and lower spring retainers 76 and 77, respectively, the former being secured to the pressure plate and the latter to the end of an adjustment screw 78 threadably received by the upper end plate and extending above the latter. A wheel 79 is mounted on the upper end of this screw for manually turning the latter to adjust the force on the pressure plate. The force of the spring 74 may be supplemented by charging the housing with steam or some other fluid under pressure through pipes 83 and 84 provided for this purpose, and perforce, more than one such spring can be utilized.

The sealing effect of the spring 74 may be supplemented by equipping the upper and lower extremities of the valve hub and rim with sealing rings 85 and 86, respectively, and providing the valve vanes with sealing bars 87. Concentric grooves 89 and 90 in the hub and rim receive the sealing rings 85 and 86 and these rings are urged by a plurality of equally spaced compression springs 91 into engagement with the underside of the pressure plate and the upper surface of the lower end plate, respectively. The top and bottom edges of the valve vanes are likewise provided with grooves, designated by 92, which intersect the grooves for the sealing rings. These grooves 92 receive the sealing bars 87 and the latter are urged away from the floor of the grooves by leaf springs 93 so as to act in concert with the sealing rings.

Figure 3:
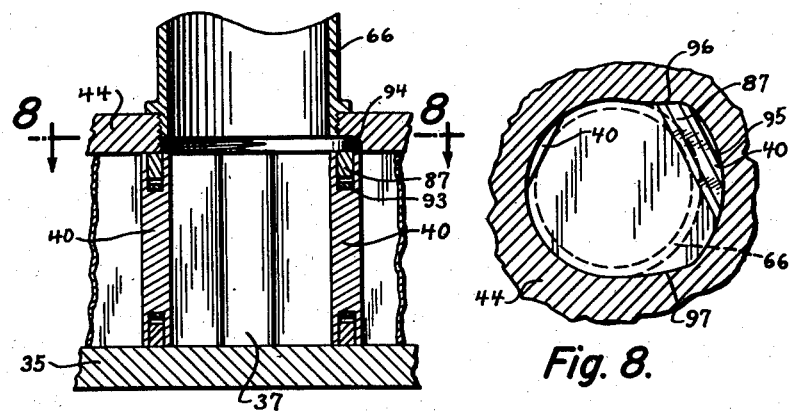
Fig. 3 is a fragmentary sectional view particularly illustrating the undercut in the lead edge of the feed opening in the pressure plate and taken along line 3—3 of Fig. 2.
Figure 8:
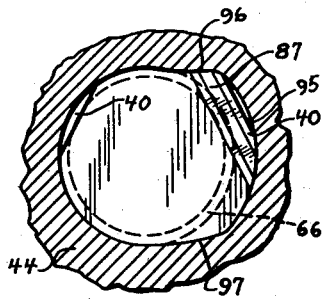
Fig. 8 is a fragmentary horizontal sectional view taken along line 8—8 of Fig. 3.

To prevent wedging and shearing of wood chips between the upper end of the valve vanes and the pressure plate when the unit is used to feed such, the leading edge of the feed opening in the pressure plate is undercut as can best be seen in Figs. 3 and 8, with the undercut being denoted by the numeral 94. The depth of the undercut is made somewhat greater than the thickness of the chips to be handled so that a chip will not wedge between a vane and the roof of the undercut. In the plan view of the undercut as shown in Fig. 8, the lead arc 95 is preferably drawn with the center of the feed opening as center and with a radius desirably, though not necessarily, exceeding that of the feed opening by an amount exceeding the longer dimension of the wood chips. The arcs 96 and 97 forming the inner and outer ends of the undercut may be both drawn from the center of the valve as a center and tangent to the periphery of the feed opening. At any rate, the important feature of the undercut is to assure that it is of sufficient length to progressively overlie that portion of the top of each advancing vane which is exposed as the vane passes beneath the feed pipe. The fact that the undercut has been explained as being particularly useful when handling wood chips is in no wise intended as a restriction in the use thereof when other materials are to be handled.

Figure 2:
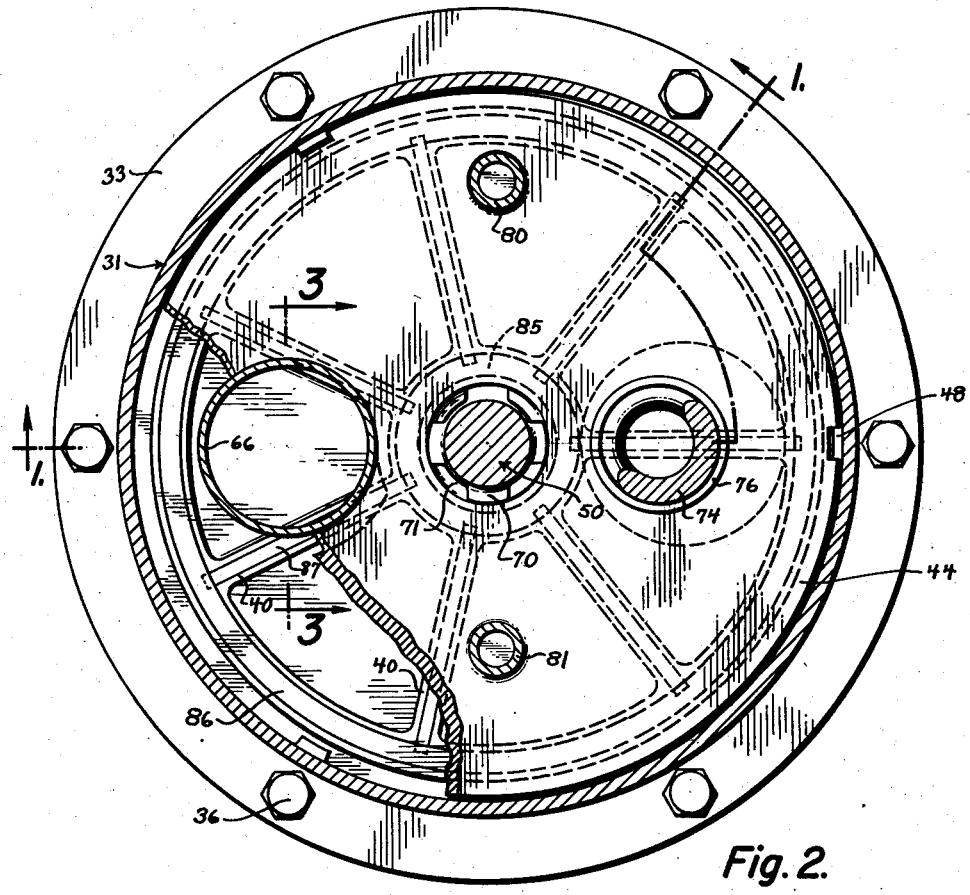
Fig. 2 is a horizontal sectional view of the feed unit taken along line 2—2 of Fig. 1.

A vent pipe 80 provided to successively communicate with the pockets as they travel from the discharge opening 72 back to the feed pipe 66 passes through a packing gland in the upper end plate 34. Since this packing gland is conventional, it is not illustrated in full but its packing nut is denoted by the numeral 82 in Fig. 1. The lower end of the vent pipe is anchored to the pressure plate and a hole is provided through the latter to successively expose the pockets to the pipe. It will be noted that the vent pipe is spaced at least a pocket distance away from the discharge opening so that the cooker can not communicate therewith via a pocket. In some installations it is desirable to raise the pressure in the pockets before such is accomplished to direct exposure to the cooker and such can be accomplished by providing a pipe 81, shown only in Fig. 2, and installed in the same manner as the vent pipe 80. This pipe 81 is positioned so as to successively communicate with the pockets as they travel from the inlet pipe to the discharge openings. It can be cross-connected to the vent pipe so that the pockets will be pressurized to a valve between the pressure of the cooker and that of the atmosphere or it can be connected directly to an independent pressure source of the desired amount.

Figure 6:
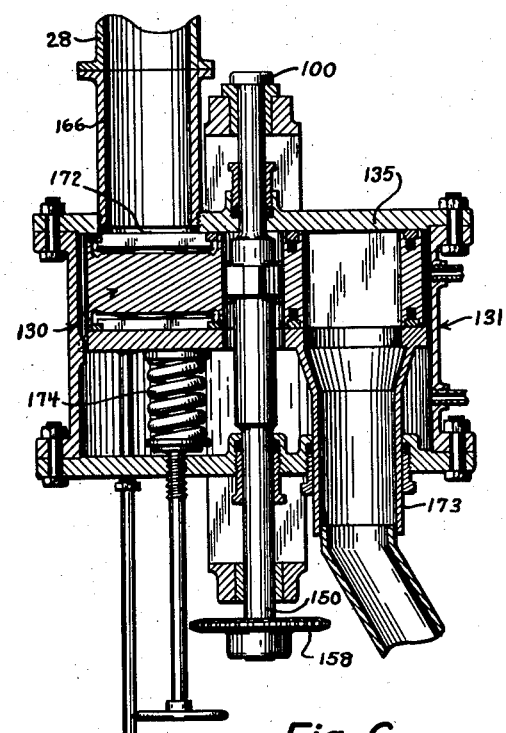
Fig. 6 is a vertical sectional view of the discharge unit, such view corresponding to Fig. 1.

Perforce, a unit as the feed unit of Fig. 1 can be utilized as a discharge unit for the cooker by connecting the inlet pipe 66 to the cooker outlet pipe 28. In the alternative the unit can be modified slightly as shown in Fig. 6 and then inverted to serve as a discharge unit. It should be here noted that for purposes of ready comparison, the parts of this discharge unit corresponding to those of the afore described feed unit have been denoted in the drawings by the same numerals as before except that the value one-hundred has been added thereto. Accordingly, it will suffice to say that the opening 172 in the end plate 135 becomes the feed opening through which the pockets are successively filled from the cooker and that the opening in the pressure plate 144 becomes the discharge opening for the pockets 142 with the size of these openings being altered accordingly. The pipe 166 is threaded into the end plate 135 to connect the opening 172 with the cooker outlet pipe 28 and the pipe 173 is secured to the pressure plate to communicate the pressure plate opening with the outside of the housing 131. The undercut 94 is provided in the end plate 135 at the lead edge of the feed opening instead of in the pressure plate, this change not being illustrated in the drawing. To provide for the end thrust of the drive shaft 150, such may be provided with a collar 100 at its upper end and this collar bears against the head of the upper shaft bearing. In the other respects the illustrated feed and discharge units are identical.

When the system is in operation, the feed unit is supplied with material in any suitable manner such as by a conveyor 101 dumping the material into a hopper 102 aligned with the feed pipe 66. It is thought that the remainder of the operation of the present invention is self-evident from the preceding description of the elements thereof and it should be noted that substantially the only steam lost from the cooker as the material is continuously fed and discharged is the steam entering the pockets of the feed and discharge units as they successively pass with the pipe communicating with the cooker. From the above discussion, it will appear obvious that the system of the present invention can also be efficiently operated when it is desired to maintain less than atmospheric pressures in the cooker. Minor changes in the details of construction will largely suggest themselves and it is my intention that no limitations be implied and that the hereto annexed claims be given a scope fully commensurate with the broadest interpretation to which the employed language admits.

What I claim is:

1. A feeder for continuously delivering material to a pressurized vessel, and comprising a floating rotary valve presenting a plurality of fully contained circumferentially spaced pockets exposed to both ends of the valve, means for rotating the valve, a floating pressure plate restrained against rotative movement and covering one of the open ends of the pockets, said plate providing an inlet opening through which the material to be fed is charged to the pockets successively, an end plate covering the other open end of the pockets and providing a discharge opening through which the charged material is emptied from the pockets successively, and pressure means for yieldingly forcing the floating pressure plate against the valve to seal the ends of the pockets and including a compression spring aligned with the said discharge opening.

2. A feeder for continuously supplying a cooking vessel subjected to a predetermined steam pressure exceeding atmospheric pressure, said feeder comprising a floating rotary valve presenting a plurality of fully contained circumferentially spaced pockets exposed to both ends of the valve, means for rotating the valve, a floating pressure plate restrained against rotative movement and covering one of the open ends of the pockets, said plate providing an inlet opening through which the material to be fed is charged to the pockets successively, an end plate covering the other open end of the pockets and providing a discharge opening through which the charged material is emptied from the pockets to the cooking vessel successively, pressure means for yieldingly forcing the pressure plate against the valve to oppose the pressure of steam entering through the said discharge opening from the cooking vessel, and means for successively venting the pockets as they progress from the discharge opening to the inlet opening.

3. A feeder for continuously supplying a cooking vessel subjected to a predetermined steam pressure exceeding atmospheric pressure, said feeder comprising a floating rotary valve presenting a plurality of fully contained circumferentially spaced pockets exposed to both ends of the valve, means for rotating the valve, a floating pressure plate restrained against rotative movement and covering one of the open ends of the pockets, said plate providing an inlet opening through which the material to be fed is charged to the pockets successively, an end plate covering the other open end of the pockets and providing a discharge opening through which the charged material is emptied from the pockets to the cooking vessel successively, pressure means for yieldingly forcing the pressure plate against the valve to oppose the pressure of steam entering through the said discharge opening from the cooking vessel, means for successively raising the pressure in the pockets to a pressure higher than atmospheric pressure as they progress from the inlet opening to the discharge opening, and means for successively venting the pockets as they progress from the discharge opening to the inlet opening.

4. A continuous feeder comprising a sealed housing having a flat bottom end plate, a floating rotary valve mounted in the housing having its lower end seated against the said end plate, said valve presenting a plurality of circumferentially spaced fully contained pockets exposed to the upper and lower ends of the valves, means for rotating the valve, a floating pressure plate within the housing restrained against rotative movement by the housing and seated against the upper end of the valve, said pressure plate providing an inlet opening through which the material to be fed is charged to the pockets successively, an axially movable inlet pipe secured to the pressure plate in surrounding relation to the said inlet opening and extending therefrom through an outer wall of the housing for supplying the material to the inlet opening, said end plate providing a discharge opening through which the charged material is emptied from the pockets successively, and pressure means contained in the sealed housing externally of the valve for forcing the pressure plate against the valve to seal the open ends of the pockets.

5. A feeder for continuously supplying a cooking vessel subjected to a predetermined steam pressure exceeding atmospheric pressure, said feeder comprising a floating rotary valve presenting a plurality of fully contained circumferentially spaced pockets exposed to both ends of the valve, means for rotating the valve, a floating pressure plate restrained against rotative movement and covering one of the open ends of the pockets, said plate providing an inlet opening through which the material to be fed is charged to the pockets successively, an end plate covering the other open end of the pockets and providing a discharge opening through which the charged material is emptied from the pockets to the cooking vessel successively, pressure means for yieldingly forcing the pressure plate against the valve to oppose the pressure of the steam entering through the said discharge opening from the cooking vessel, and means for successively venting the pressure in the pockets traveling from the discharge opening to the inlet opening into the pockets traveling from the inlet opening to the discharge opening.

6. A continuous feeder comprising a sealed housing presenting a flat end plate, a rotary valve normally seated at one of two ends against the end plate and presenting a plurality of circumferentially spaced fully contained pockets exposed to both ends of the valve, a drive shaft coupled to the valve in a manner permitting axial movement of the valve, a pressure plate within the housing covering the other end of the valve and splined to the housing, one of said plates providing an inlet opening through which the material to be fed is charged to the pockets successively and the other plate providing a discharge opening through which the charged material is emptied from the pockets successively, slidable means connecting the opening in the pressure plate with a respective external opening in the housing, and pressure means within the housing for yieldingly forcing the pressure plate against the valve and the valve against the flat end plate to seal the ends of the pockets.

7. The structure of claim 6 in which the said pressure means includes fluid under pressure.

8. A feeder unit comprising a housing assembly having an inlet and an outlet, a rotary valve seated in the housing and presenting a plurality of compartments arranged to successively communicate with the said inlet and outlet, means within the housing for sealing off the outlet from the inlet, and pressure means including fluid under pressure within the housing for yieldingly seating the valve.

9. A continuous cooking system comprising a sealed elongated cooker having a maintained internal pressure greater than the atmospheric pressure and having an inlet and outlet, feed means presenting a pocket and arranged and adapted to continuously bring said pocket into and away from exposure to the inlet of the cooker and to seal off said pocket from all other external communication while it is exposed to the cooker, means for filling said pocket with the material to be cooked while the pocket is not exposed to the cooker, discharge means presenting a pocket for removing cooked material from said cooker, said discharge means being arranged and adapted to continuously bring its pocket into and away from exposure to the outlet of the cooker and to seal off its pocket from all other external communication while it is exposed to the cooker, means for emptying said latter pocket while it is not exposed to the cooker, and means in the cooker for mixing and converging the material supplied thereto by said feed means from the inlet to the outlet of the cooker, and including a plurality of radially extending rotating paddles spaced longitudinally of the cooker, the paddles near the inlet to the cooker being turned to urge the material toward the outlet thereof and the paddles at the outlet being turned to slow the progress of the material through said outlet into the pocket of said discharge means.

References Cited in the file of this patent

UNITED STATES PATENTS

| | | |
|---|---|---|
| 674,685 | Payson | May 21, 1901 |
| 748,414 | Parsburg | Dec. 29, 1903 |
| 1,188,581 | Thompson | Jan. 27, 1916 |
| 1,321,262 | Townsend | Nov. 11, 1919 |
| 1,382,148 | Walker | June 21, 1921 |
| 1,715,065 | Hiller | May 28, 1929 |
| 1,836,641 | Brett | Dec. 15, 1931 |
| 2,314,031 | Colburn | Mar. 16, 1943 |
| 2,417,700 | McCarty | Mar. 18, 1947 |
| 2,524,572 | Riemenschneider | Oct. 3, 1950 |

FOREIGN PATENTS

| | | |
|---|---|---|
| 119,715 | Great Britain | Oct. 17, 1918 |